United States Patent
Heckel, Jr.

[11] Patent Number: 6,116,103
[45] Date of Patent: Sep. 12, 2000

[54] DEVICE FOR SECURING GEAR NUT ON ACTUATOR

[75] Inventor: Donald T. Heckel, Jr., Westfield, Ind.

[73] Assignee: P. L. Porter Co., Woodlands Hills, Calif.

[21] Appl. No.: 09/087,069

[22] Filed: May 29, 1998

[51] Int. Cl.[7] .................................................. F16H 27/02
[52] U.S. Cl. .................................. 74/89.15; 74/424.8 R; 74/411.5; 188/69
[58] Field of Search ........................... 74/89.15, 424.8 R, 74/424.8 A, 411.5; 248/429, 430; 192/141; 188/31, 69

[56] References Cited

U.S. PATENT DOCUMENTS

| | | | |
|---|---|---|---|
| 4,799,734 | 1/1989 | Periou . | |
| 4,881,775 | 11/1989 | Rees . | |
| 5,074,507 | 12/1991 | Axelson et al. | 248/305 |
| 5,299,853 | 4/1994 | Griswold et al. | 297/362.12 |
| 5,320,413 | 6/1994 | Griswold et al. . | |
| 5,516,071 | 5/1996 | Miyauchi | 248/429 |
| 5,582,461 | 12/1996 | Pickles | 297/362.14 |
| 5,589,135 | 12/1996 | Bossart | 422/99 |
| 5,689,995 | 11/1997 | Heckel, Jr. | 74/89.15 |
| 5,876,096 | 3/1999 | Yamakami | 297/344.13 |

*Primary Examiner*—David M. Fenstermacher
*Attorney, Agent, or Firm*—Oppenheimer Wolff & Donnelly LLP

[57] ABSTRACT

A threaded leadscrew moves axially within the housing of a linear actuator. The leadscrew's movement rotates a threaded gear nut that surrounds the leadscrew. Stopping the gear nut rotation prevents leadscrew translation. The locking mechanism for selectively blocking rotation of the gear nut includes a cam mounted on the housing, which connects remotely to a user actuated handle. A lever, which mounts on the cam, has a tooth movable between adjacent teeth on the gear nut. The cam also has a blocker that engages the lever. When the cam is in the closed position, the blocker prevents the lever from moving to its released position away from the gear nut's teeth. When the cam is moved to the released position, the blocker releases the lever and allows it to move away from the gear nut. The lever has an opening that is somewhat bigger than a pin on the cam that extends into the opening. When the pin reaches one surface of the opening, it pulls the lever out of its engaged position. However, before the pin reaches that position, the blocker on the cam has already disengaged the lever. Therefore, further movement of the cam pulls the lever out of engagement with the teeth on the gear nut, and the blocker on the cam is moved to a position where it does not prevent that movement.

15 Claims, 3 Drawing Sheets

DEVICE FOR SECURING GEAR NUT ON ACTUATOR

BACKGROUND OF THE INVENTION

1. Field of the Invention

The present invention relates to linear seat actuators, especially ones in which a threaded leadscrew rotates a gear nut as the lead screw translates. Stopping gear nut rotation prevents leadscrew translation. The present invention teaches an improved locking mechanism that positively secures the gear nut in such an actuator.

2. State of the Art

U.S. Pat. No. 5,689,995, entitled "Actuator that Adjusts to Side Loads Automatically by Pivoting Internally," and owned by P. L. Porter Co., the assignee of this application, teaches a linear actuator. It uses a leadscrew or threaded shaft that translates axially when a vehicle seat is reclined. As the leadscrew moves axially, a threaded gear nut or spin nut rotates about the leadscrew. The actuator has a mechanism that engages or disengages the gear nut when a user manually activates a recline lever. When the locking mechanism engages the gear nut and prevents gear nut rotation, the gear nut locks the leadscrew from further axial movement. Griswold, U.S. Pat. No. 5,320,413 (1994), Rees U.S. Pat. No. 4,881,775 (1989), and Periou U.S. Pat. No. 4,799,734 (1989), are other examples of patents teaching similar types of seat actuators.

The locking mechanism typically has a lever that can extend between adjacent teeth of the gear nut. When in that position, the lever blocks gear nut rotation. Several problems can occur. The lever may not come down exactly between the teeth. If that happens, the lever may not fully engage the gear nut. However, the actuator may appear to be locked. Later, relatively small forces on the leadscrew provide a torque on the gear nut that is sufficient to move the lever out of the gear nut. Moving the lever out of engagement with the gear nut can release the actuator. Applicant also is concerned that even if the lever properly engages the gear teeth, large forces may urge the lever out of the gear nut and release the actuator. Users of many prior art devices must cause a handle to rotate through a long distance to engage the actuator.

SUMMARY OF THE INVENTION

The principal object of the present invention is to overcome these problems.

The linear actuator of the present invention includes a housing that mounts to a vehicle. A threaded leadscrew moves axially within the housing. A gear nut in the housing surrounds the leadscrew and is threaded onto the lead screw. Consequently, the gear nut rotates when the leadscrew moves axially within the housing. As long as the gear nut can rotate freely, the leadscrew translates freely.

The linear actuator also has a locking mechanism for selectively blocking rotation of the gear nut. The locking mechanism includes a cam mounted on the housing. That cam can connect remotely to a handle accessible by the driver or passenger. A lever mounts on the cam. The lever has a tooth movable between adjacent teeth on the gear nut when the lever pivots. The cam also has a blocker that engages the lever. When the cam is in the closed position, the blocker prevents the lever from moving to its released position away from the gear nut's teeth. When the cam is moved to the released position, the blocker releases the lever and allows it to move away from the gear nut.

The lever has an opening that is somewhat bigger than a pin on the cam that extends into the opening. This arrangement provides a dwell. When the pin on the cam reaches one surface of the opening, it pulls the lever out of its engaged position. However, before the pin reaches that position, the blocker on the cam has already moved out of engagement from the lever. Therefore, further movement of the cam pulls the lever out of engagement with the teeth on the gear nut, and the blocker on the cam is not positioned to prevent that movement.

The actuator's construction allows for quick opening with about 10° of rotation.

These and other objects of the invention may be seen more clearly from the detailed description of the preferred embodiment that follows.

DETAILED DESCRIPTION OF THE PREFERRED EMBODIMENTS

Figure 1:
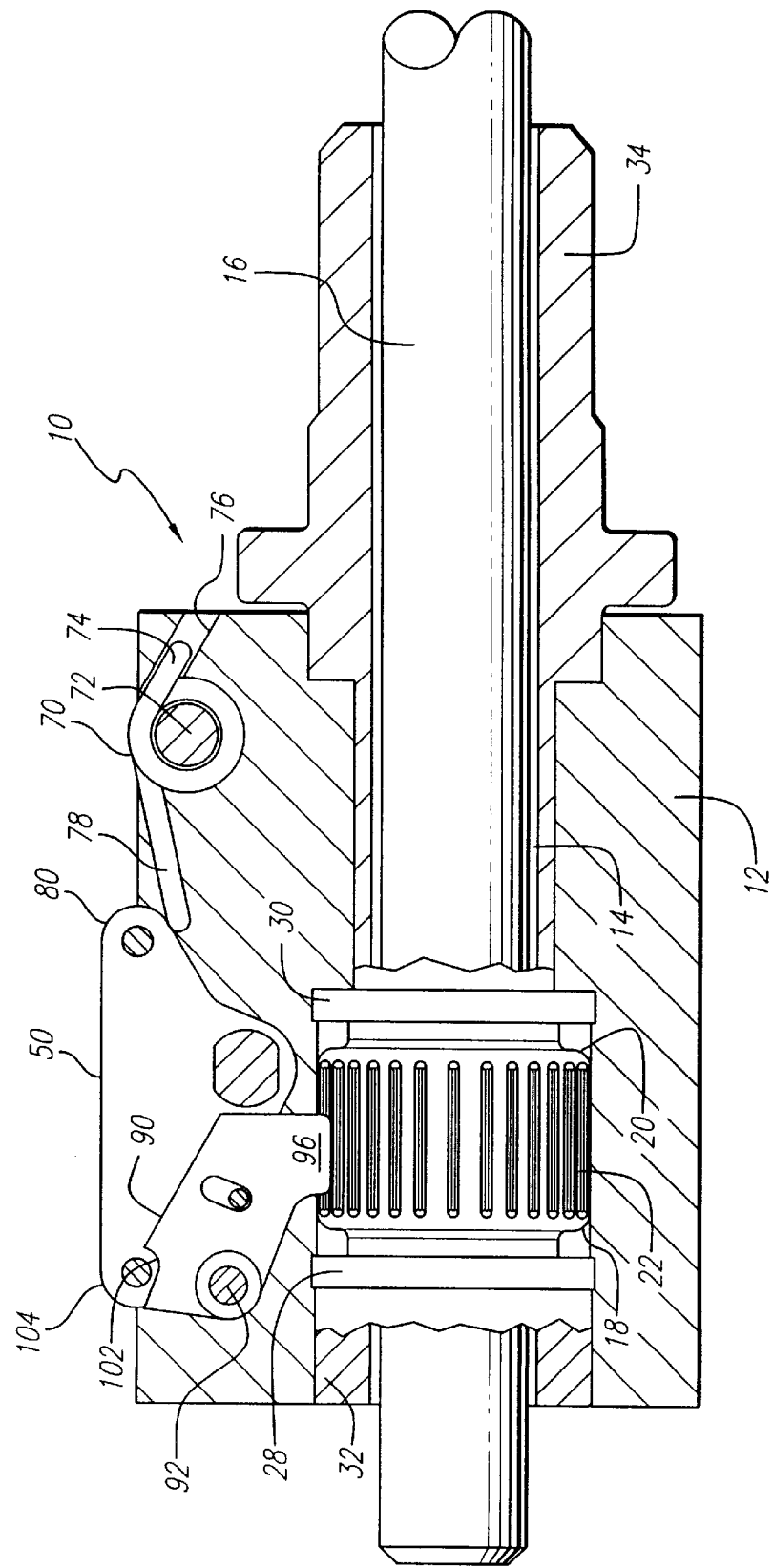
FIG. 1 is a side elevation of the linear actuator of the present invention.
Figure 3:
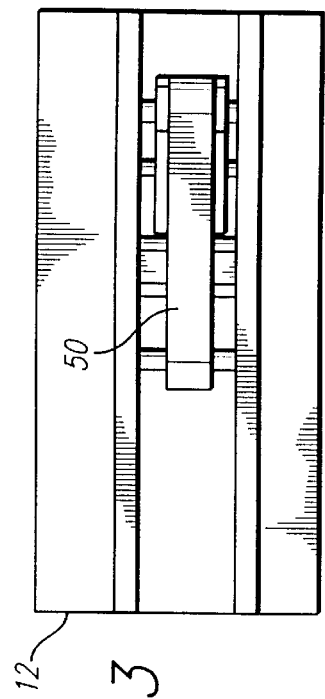
FIG. 3 is a plan view of the linear actuator taken through plane 3—3 of FIG. 2.
Figure 2:
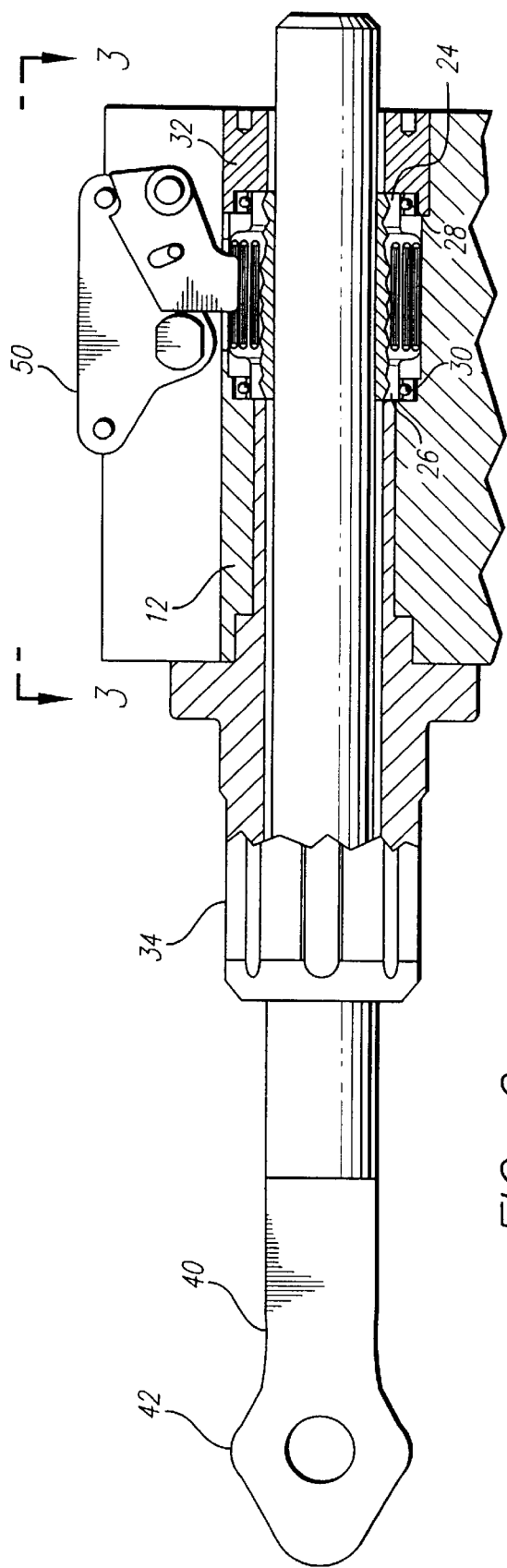
FIG. 2 is a side sectional view of the actuator of the present invention.

The linear actuator 10 of the present invention comprises a housing 12 formed of a suitable metal. The exemplary embodiment uses aluminum for its light weight, but other metals and plastics may be used depending on the application and the acceptable cost. The housing has a central opening 14 that mounts a leadscrew 16. The outer surface of leadscrew 16 is threaded. In the exemplary embodiment (FIGS. 1 and 3), leadscrew 16 has an ACME thread. The design of the seat that incorporates the actuator of the present invention determines the leadscrew's length. One choice for the leadscrew is ⅝ in (16 mm (metric conversions are rounded and approximate)) diameter with a 4 threads per inch pitch and two starts. The drawings do not show the threads. U.S. Pat. No. 5,689,995, which is incorporated by reference, shows a threaded leadscrew in an actuator. The opening in the housing also receives a gear nut 18. It is powdered metal (FX1000) in the exemplary embodiment, but investment cast steel such as 4130 steel or other metals are acceptable. The gear nut has a body 20 and circumferentially extending gear teeth 22. As FIG. 2 shows, gear nut body 18 has two short shafts 24 and 26 that extend into bearings 28 and 30. Thus, the shafts of the gear nut can rotate and allow rotation of the gear nut within opening 14 of housing 12.

The inside of the gear nut has an opening with internal threads (not shown) that mate with the external threads of leadscrew 16. Accordingly, as leadscrew 16 translates within the housing, the gear nut rotates. The housing also has a pair of bushings 32 and 34 (FIGS. 1 and 2). The bushings support leadscrew 16 with minimal friction, but they also help seal the inside of the housing. The bushings do not have threaded engagement with the leadscrew.

When the gear nut 18 rotates freely, the leadscrew 16 can translate freely. Ideally, one would want to minimize friction between the gear nut and leadscrew and eliminate anything that would impede the gear nut from rotating. Doing so allows the leadscrew 16 to translate freely.

The leadscrew's end 40 has a tang 42 that connects to a mating piece on the seat. Structure (not shown) mounts the actuator on the vehicle. Gimbals or other structure may be provided to allow some pivoting of the entire actuator. The choice of the mounting structure depends on the vehicle and seat design.

Figure 4:
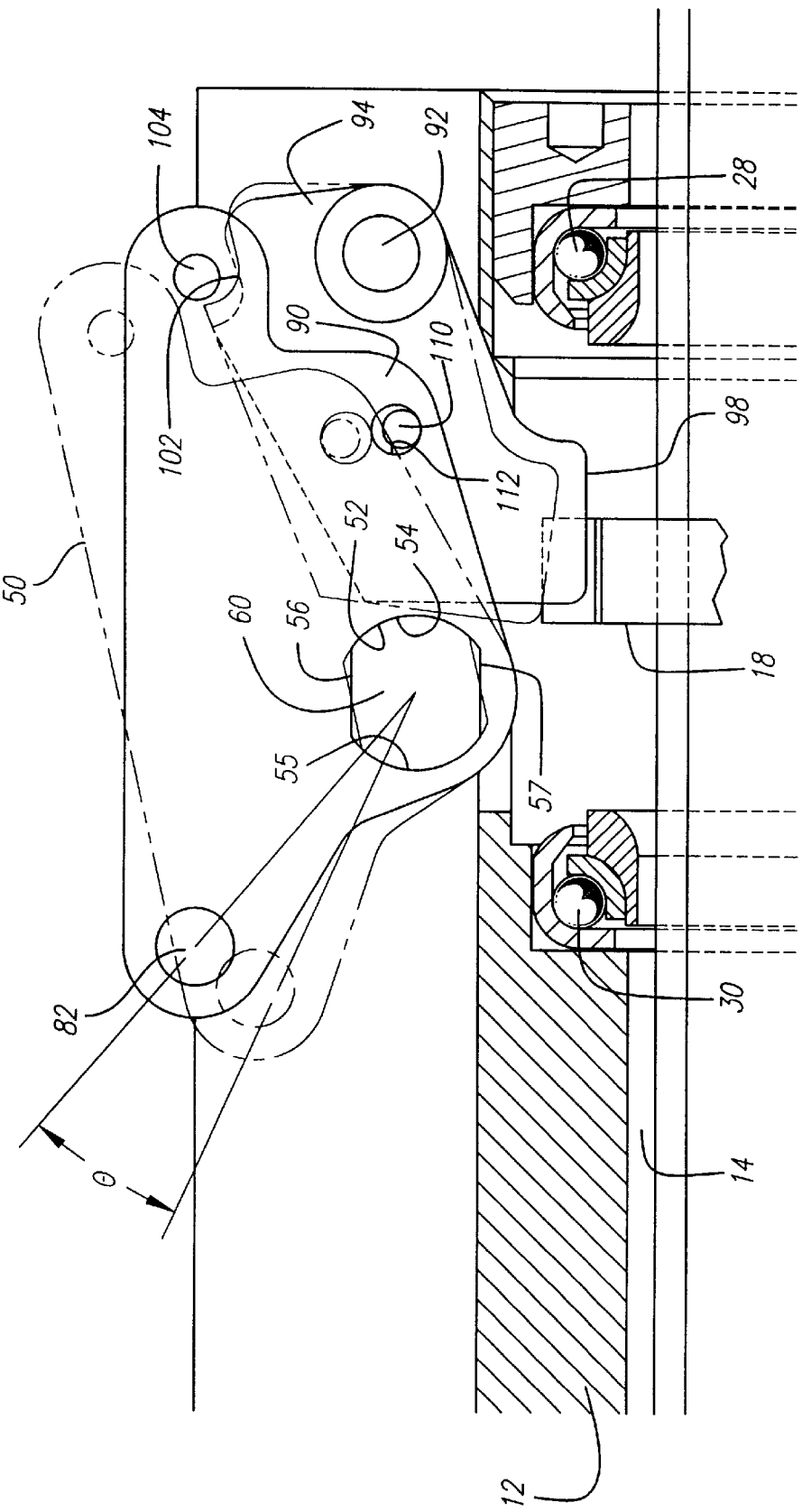
FIG. 4 is a side sectional view showing in detail the mechanism that secures the gear nut.

Cam 50 mounts on the housing (FIGS. 1, 2 and 4). In the exemplary embodiment, cam 50 is either found of powdered metal or is a steel investment casting. The cam has a bore 52 (FIG. 4) that mates with a shaft 60. The shaft extends from the housing. Bore 52 has rounded ends 54 and 55 and flat top and bottom 56 and 57. Shaft 60 has a similar shape to bore 52 so that shaft rotation pivots cam 50. Other shapes for the shaft and bore are possible, but the shapes should lock the shaft within the bore.

The shaft connects to a manual or electrical release (not shown). The construction of shaft 60 and cam 50 permit the cam to pivot through an angle θ (FIG. 4). A manually-driven cable also may pivot the cam.

The housing 12 mounts a torsion spring 70 around post 72 (FIG. 1). A fixed end 74 of the spring rests in housing notch 76. The other end 78 of the spring engages the forward end 80 of cam 50. Though the connection of spring 70 to the forward end 80 of the cam is not shown, the spring extends around a pin 82 (FIG. 4) in the cam. The spring is pre-tensioned to urge the cam downward (FIGS. 1 and 4).

Lever 90 mounts for pivoting adjacent gear nut 18. In the exemplary embodiment, the lever is a steel investment casting. The lever mounts on a shaft 92 on the rear end 94 of cam 50 (FIGS. 1 and 4). The lever has an arm section 96 and a flat tooth section 98 depending from the arm. The bottom of tooth 98 is rounded in the exemplary embodiment to conform to the troughs between the teeth 22 on the gear nut. Rounding the tooth bottom may not be necessary.

FIG. 1 shows lever 90 in its engaged or locked position. In that position, the lever engages the teeth on the gear nut and prevents the gear nut from rotating. That locks the leadscrew 16 because the leadscrew cannot translate when the gear nut is locked.

As previously discussed, high axial loads on the leadscrew generates a torque on the gear nut. Such a torque urges the lever out of its engagement with the gear nut teeth. To alleviate that problem, a blocker on the cam engages a portion of the lever to prevent movement of the lever out of the gear nut. Lever 90 has a recess 102 spaced from the lever's tooth portion 98 and from the pin/pivot point 92 (FIGS. 1 and 4). In the exemplary embodiment, the blocker comprises a projection 104 on cam 50 that seats in recess 102 when the cam is in the closed, locked position. In FIG. 4, projection 104 is a round pin, and the recess 102 on lever 90 conforms to the round pin. However, in the FIG. 1 embodiment, projection 104 is shaped as a rounded triangle and mates with a similarly shaped surface on recess 102. The shapes for the recess and projection are matters of choice. They will depend on limiting fabrication expenses while maintaining the parts' functionality. As best shown in FIG. 1, recess 102 and projection 104 are positioned to absorb torsion forces acting on the cam. Accordingly, when the cam 50 is in its locked position, the engagement of projection 104 in recess 102 locks the lever in its locked position in the teeth on the gear nut.

As FIG. 1 shows, wall 106 of recess 102 is aligned with pivot point 92. Neither the wall 106 nor the facing surface 108 of the projection are flat in the exemplary embodiment. The small curvature helps to hold the parts together. If wall 106 were flat, its plane would pass through pivot point 92. However, the small curvature of wall 106 still allows the same effect. In FIG. 4, the projection 104 is a round pin, and wall 106 still captures the pin.

When a user releases cam 50 through rotation of shaft 60, projection 104 moves out of recess 102 (FIG. 4). At this point, the cam no longer locks lever 90 in the gear teeth. Initial movement of the cam, however, does not start movement of the lever. Cam 50 also has a pin 110 that is within a slot 112 on the lever (FIGS. 1 and 4). The shape of slot 112 is such that the pin can move within the slot. Additional movement of the cam moves the pin 110 against the upper surface of slot 112. The pin then urges the lever around its pivot (counterclockwise in FIG. 1). That action releases the lever from the gear teeth on the gear nut. Therefore, with the cam in the fully released position, the gear nut can rotate, and the leadscrew can translate.

To lock the actuator, one stops urging shaft 60 counterclockwise (FIG. 4). The torsion spring 70 urges the cam clockwise. As the cam rotates, pin 110 engages the bottom surface of slot 112 (FIG. 4). The pin, therefore, pushes the lever into the gear teeth. As the lever engages the gear, projection 104 engages the recess 102. Therefore, as the lever engages the gear nut, the projection 104 against recess 102 locks the lever in its engaging position.

In the invention's exemplary embodiment, the gear nut rotates and does not move axially, and the leadscrew does not rotate but does move axially. In another embodiment (not shown), the leadscrew and gear nut rotate together and the leadscrew does not translate relative to the gear nut. Instead, the leadscrew extends to a remote nut that cannot rotate but can translate axially. Consequently, as the gear nut and leadscrew rotate together, the remote nut translates along the leadscrew. One can modify the locking mechanism of the present invention to function in such a gear nut.

Other numerous modifications and alternate embodiments will occur to those skilled in the art. Therefore, applicant intends that the invention be limited only in terms of the appended claims.

What is claimed is:

1. A linear actuator comprising a housing, a threaded leadscrew moving axially in the housing and a gear nut being around the leadscrew, the gear nut rotating in response to axial movement of the leadscrew relative to the gear nut, and a locking mechanism for locking the gear nut, the locking mechanism comprising:

a. a cam mounted on the housing for pivoting between a closed and open position;

b. a lever adjacent to the gear nut and mounted for pivoting about a lever pivot axis, the lever having a lever tooth spaced from the lever pivot axis, the lever tooth being movable between adjacent teeth on the gear nut when the lever pivots;

c. a blocker on the cam, the cam having a released and an engaging position, wherein the blocker engages a portion of the lever when the cam is in the engaging position, and the blocker is free from a portion of the lever when the cam is in the released position.

2. The linear actuator of claim 1 wherein the portion of the lever engaged by the blocker is a recess, the blocker comprising a projection on the cam extending into the recess when the cam is in the engaging position.

3. The linear actuator of claim 2 wherein the recess has at least one shoulder, the plane of the surface of the shoulder intersecting the lever pivot axis.

4. The linear actuator of claim 3 wherein the blocker has a surface conforming to the surface of the recess.

5. The linear actuator of claim 1 further comprising a slot in the lever and a pin on the cam seated in the slot.

6. The linear actuator of claim 5 wherein the slot has a top and bottom surface, the pin engaging the bottom surface of the slot when the cam is in the engaging position, the pin acting on the top of the slot pivots the cam to the release position.

7. The linear actuator of claim 6 wherein the distance between the top and bottom of the slot is sufficient to permit the blocker to move out of the recess before the pin acting on the top surface of the slot moves the lever to the released position.

8. A linear actuator comprising a housing, a threaded leadscrew in the housing and movable axially within the housing, a gear nut in the housing around the leadscrew, the gear nut being threaded onto the leadscrew so that the gear nut rotates when the leadscrew moves axially within the housing, and a locking mechanism in the housing for selectively blocking rotation of the gear nut, the locking mechanism comprising:

a. a cam mounted on the housing;

b. a lever mounted for pivoting adjacent to the gear nut, the lever having a lever tooth movable between adjacent teeth on the gear nut when the lever pivots;

c. a blocker on the cam, the cam having a released and an engaging position, wherein the blocker engages a portion of the lever when the cam is in the engaging position, and the blocker is free from a portion of the lever when the cam is in the released position.

9. A linear actuator having a locking mechanism for locking a gear nut of a linear actuator, the linear actuator having a leadscrew in a housing and the gear nut rotating in the housing, wherein the locking mechanism comprises:

a. a cam mounted on the housing for pivoting between a closed and open position;

b. a lever adjacent to the gear nut, the lever mounted for pivoting about a lever pivot axis, the lever having a lever tooth movable between adjacent teeth on the gear nut when the lever pivots;

c. a blocker on the cam, the cam having a released and an engaging position, wherein the blocker engages a portion of the lever when the cam is in the engaging position, and the blocker is free from a portion of the lever when the cam is in the released position.

10. The locking mechanism of claim 9 wherein the portion of the lever engaged by the blocker is a recess, the blocker comprising a projection on the cam extending into the recess when the cam is in the engaging position.

11. The locking mechanism of claim 10 wherein the recess has at least one shoulder, the plane of the surface of the shoulder intersecting the lever pivot axis.

12. The locking mechanism of claim 11 wherein the blocker has a surface conforming to the surface of the recess.

13. The locking mechanism of claim 9 further comprising a slot in the lever and a pin on the cam seated in the slot.

14. The locking mechanism of claim 13 wherein the slot has a top and bottom surface, the pin engaging the bottom surface of the slot when the cam is in the engaging position, the pin acting on the top of the slot pivots the cam to the released position.

15. The locking mechanism of claim 14 wherein the distance between the top and bottom of the slot is sufficient to permit the blocker to move out of the recess before the pin acting on the top surface of the slot moves the lever to the released position.

* * * * *